Oct. 16, 1945.                S. WEISS                2,387,047
ELECTRIC CONTROL SYSTEM
Original Filed Dec. 29, 1941

INVENTOR
SAMUEL WEISS

BY Geisler and Geisler.

ATTORNEYS

Patented Oct. 16, 1945

2,387,047

UNITED STATES PATENT OFFICE 2,387,047

ELECTRIC CONTROL SYSTEM

Samuel Weiss, Portland, Oreg., assignor to Vaughan Motor Company, Inc., Portland, Oreg., a corporation of Oregon Original application December 29, 1941, Serial No. 424,723. Divided and this application August 3, 1942, Serial No. 453,473

7 Claims. (Cl. 172—239)

This application is a divisional application, divided from my co-pending application, Serial No. 424,723, filed December 29, 1941, Patent Number 2,361,439, entitled "Torque control switch."

This invention relates in general to automatic control devices for preventing the operation of motor-driven means beyond the point where too great a load or torque strain will result.

More specifically, this invention relates to an electric control system, the operation of which, for the purpose of shutting off the power to a power-driven device, will be regulated by the torque load imposed upon such device when the device is operated in one direction.

An important use for my invention has been found in the control required for the proper motor operation of valves, particularly valves of the gate valve type, and in my above mentioned co-pending application, I have explained the purpose and mode of operation of my invention when used in connection with a gate valve employing an operating motor and requiring control means therefor.

In such a gate valve, particularly a valve of the wedge-gate type, when the closing and opening of the valve is produced through the operation of an electric motor, sufficient force must be exerted by the motor, when closing the valve, to insure the complete and proper seating of the valve in the valve seat, and when this is properly accomplished, further operation of the motor should be immediately prevented, since such further operation would merely result in an undesirable torque strain on the operating mechanism. However, various conditions may effect the amount of power required for properly seating the valve, as well as the length of the period of operation of the motor for this purpose; and, furthermore, it will be found that when a wedge-gate valve has been firmly seated in its valve seat, a considerably greater exertion of power is required at first in order to start to re-open the valve than is required in closing or seating it.

The principal object of the present invention is to provide an improved electric control system adapted to be employed in combination with a torque control device such as that described in my said co-pending application.

The nature and operation of my electric control system will be described with reference to the accompanying drawing in which.

Figure 1:
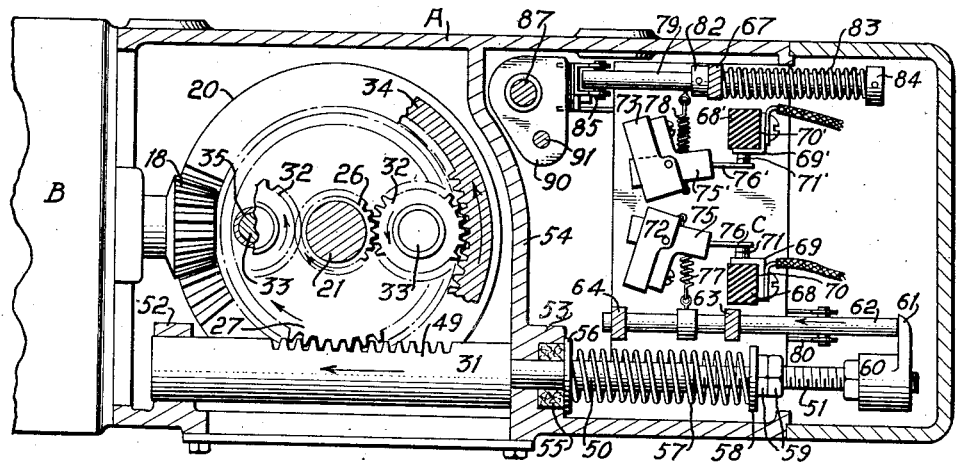
Figure 1 is a sectional plan view of the electric control unit showing the same associated with the torque control device described in my said co-pending application.

A reversible motor B is assumed to be employed for the operation of a transmission mechanism, for example such as that described in my above mentioned co-pending application, in which a bevel pinion 18, connected to the motor shaft, meshes with a bevel gear 20 secured on a shaft 21. A spur gear 26 is also secured to shaft 21. A planetary gear 34, connected to the shaft to be driven by the transmission, meshes with a pair of planetary pinions 32 which in turn mesh with said spur gear. The planetary pinions are supported on stub shafts 33 having shouldered bushings 35 and mounted on a pinion-carrying member 27. Pinion-carrying member 27 is normally held against rotation by the rack or torque control member 31, and axial movement of the latter under the excessive torque load conditions described in my above mentioned co-pending application operates the electric switch means designated in general by C. The transmission mechanism and switch are supported in a housing A.

The rack or torque control member 31 comprises a toothed body portion 49 and a stem 50 of smaller diameter, the end 51 of which is further reduced in diameter and is threaded. The opposite end of the body portion 49 is slidably journaled in a bearing 52 integral with the housing. The stem 50 is journaled in a hub 53, formed in the partition 54 of the housing, which partition divides the gear mechanism from the control switch. Suitable packing material 55 is disposed about the stem 50 within a recess in the hub 53 to prevent any lubricant from the gear mechanism leaking into the compartment containing the control switch. A washer 56 holds the packing material 55 within the recess.

A compression spring 57 is carried on the stem 50 and is held under tension between washer 56 at one end and washer 58 at the other end. Lock nuts 59 hold the latter washer and provide the means for adjusting the tension of the spring 57. A trip member 60 is also carried on the threaded end 51 of the stem 50 and is longitudinally adjustable thereon. The trip member 60 has a tripping arm 61 adapted to engage a slidable trip rod 62.

Figure 2:
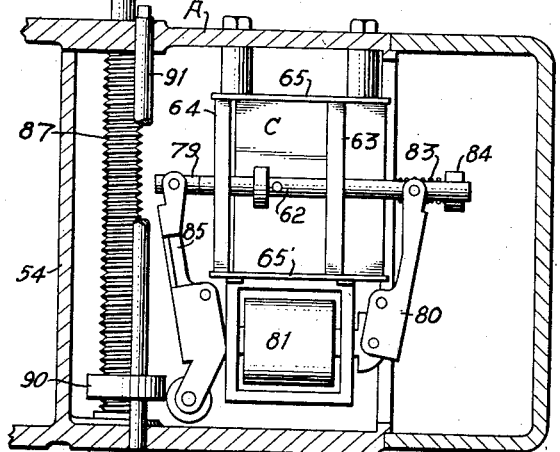
Figure 2 is a sectional side elevation of the switch unit.

A pair of top and bottom plates 65 and 65' are spaced apart and secured together by posts 63, 64 and 67, and the top plate in turn is attached to the top of the housing A as shown in Fig. 2.

The trip rod 62 is supported in, and slides through, the posts 63 and 64. A lever 80 (Fig. 2), pivoted on a lug attached to the bottom plate 65', has its upper or long arm hingedly connected to the trip rod 62 and its lower or short arm hingedly connected to the movable core of a solenoid coil 81, which solenoid coil is also supported from the bottom plate 65'.

A second trip rod 79, located at substantially the same level as trip rod 62, is slidably supported in the post 67 extending between the plates 65 and 65'. This second trip rod 79 is provided with a pair of set collars 82 and 84 located as shown in Fig. 1. A spring 83, carried on the trip rod 79, and held under tension between the post 67 and the collar 84, normally keeps the trip rod 79 in the position shown in Fig. 1 with the set collar 82 urged against the post 67. A lever 85, pivotally mounted on a lug attached to the bottom plate 65', has its upper end connected to the trip rod 79 and carries a cam roller at its lower end.

Figure 4:
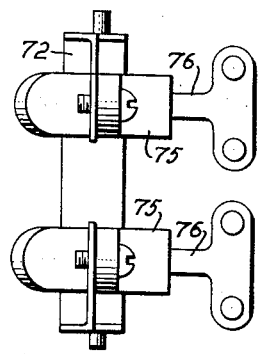
Figure 4 is a side elevation of one of the pair of swinging brackets and associated contact elements of my improved electric switch.

A pair of posts 68 and 68' (Fig. 1) of insulating material also extend between the plates 65 and 65'. Two pairs of metal contact plates 69 and 69' are secured to each of the insulating posts 68 and 68', respectively. Each contact plate 69 and 69' has a terminal 70 or 70', to which a conductor wire is attached and a breaker point 71 or 71'. A contact bracket 72 is pivotally mounted between the top and bottom plates 65 and 65' and is connected by a snapover spring 77 to the trip rod 62. A second similar pivotally-mounted contact bracket 73 is oppositely mounted between the plates 65 and 65', and is connected by a snapover spring 78 to the second trip rod 79. The two contact brackets are identical except that they are oppositely arranged, and one of these contact brackets is shown in Figure 4. Each bracket carries two pairs of contact elements 76 or 76', adapted to close the contacts respectively between a corresponding pair of breaker points 71 or 71' on the posts 68 or 68'. The pairs of contact elements 76 and 76' are resiliently mounted in insulating blocks 75 and 75' carried by the contact brackets 72 and 73 respectively.

A vertical shaft 88 is journaled in the housing A and is connected with the transmission mechanism by means (not shown) so as to be rotated thereby. The portion 87 of the shaft which is located within the housing A, is threaded and a cam nut 90 is mounted thereon. The cam nut 90 is also slidable on a vertical guide rod 91 which serves to prevent the nut 90 from turning when the shaft 88 is rotated and thus the rotation of the shaft 88 produces up or down movement of the cam nut 90 within the housing A. The purpose of the cam nut 90 is to engage the cam roller at the bottom of lever 85 and the device is so arranged that, when the transmission mechanism operates in a direction opposite that indicated by the arrows in Figure 1 the shaft 88 will be rotated so as to move the cam nut 90 downwardly until, when the transmission mechanism has operated a predetermined amount in said opposite direction, the cam nut 90, by engaging the cam roller, will produce movement of the trip rod 79 against the tension of its spring 83, and result in the shutting off of the current to the motor preventing further operation of the motor in said opposite direction.

When the transmission mechanism is operating in the direction indicated by the arrows in Figure 1, and an excessive torque load is imposed, this excessive torque will force the rack 31 to move to the left against the tension of spring 57, and this in turn will cause the tripping arm 61 to push trip rod 62 to the left. This movement of the trip rod 62 to the left will swing the bracket 72, through the medium of the connecting spring 77, and break the connection between the pairs of contact points 71 and contact elements 76, causing the circuit to the motor to be disconnected, through switch means to be indicated later, and consequently stops all further operation of the motor in that direction.

Figure 3:
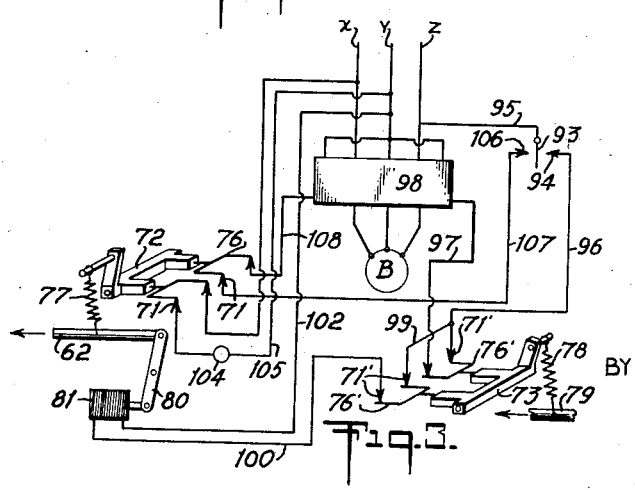
Figure 3 is a diagrammatic layout of the electric control system illustrating the various elements and circuits.

The electrical switch connections, and the function and operation of the circuits, constituting part of the switch C, can best be explained from the wiring diagram of Figure 3. The reversible motor B is connected to the power lines $x$, $y$, and $z$, by means of a magnetic switch 98 of conventional, well-known type, which need not be described. A manual switch 93, connected to the power line $z$ by the conductor 95, is provided for controlling the entire operation of the device, and the various elements, in general, are so arranged that closing the switch with the terminal 94 will produce operation of the motor in one direction while closing the switch contact with the other terminal 106, will produce operation of the motor in the opposite direction.

Let it be assumed that the trip rod 62 is in its normal, or extreme right position, with the bracket 72 swung so as to close the contacts 71, 76, and that it is now desired to operate the transmission mechanism in the direction indicated by the arrows in Figure 1 until excessive torque is encountered. The manual switch 93 is turned to close the contact to terminal 106. Current then passes over the conductor 107, through one pair of breaker points 71 which are connected by contact elements 76, thence over conductor 108, to the magnetic switch 98. This will throw the magnetic switch 98 into such a position that current will be permitted to pass to the motor B to operate the motor in the desired direction.

For convenience, in order to indicate at all times when the bracket 72 is in closed position, I provide an electric signal device or indicator, for example, a small electric light bulb 104 connected to the conductor 105. Whenever the contacts 71, 76, are closed, that is to say, whenever the trip rod 62 is in its normal position, the signal 104 will be energized. When the excessive torque load has resulted in the movement of the trip rod 62, as previously described, causing the opening of the contacts 71, 76, the signal means 104 will no longer be in operation.

When the torque load has caused such movement of the rack bar 31 and trip rod 62 to throw the bracket 72 into open position the current of conductor 108 is shut off, which causes the magnetic switch 98 in turn to shut off the current to the motor B.

From Figure 1 it will be apparent that the return of rack bar 31 to its normal position will not move the trip rod 62 and will not therefore swing the bracket 72 to closed position. When bracket 72 has once been swung to open position it will not be closed until the motor is caused to operate in reverse direction. Now let it be assumed that the transmission mechanism is to be operated in the opposite direction. The switch 93 is moved to close the contact to terminal 94, whereupon current passes over conductor 96, through one pair of closed contacts 76', 71', and over conductor 97 to the magnetic switch 98. This causes current to be permitted to pass to motor B to operate the motor in reverse direction. Simultaneously current from conductor 96 passes over the branch 99, through the second pair of contacts 76', 71', through conductor 100, solenoid 81, and conductor 102. The energizing of the solenoid 81 pulls the trip rod 62 back to its normal position, closing its control pairs of contacts 76, 71, and the closing of one of these pairs of contacts causes the signal to be energized, as previously explained.

Operation of the motor in this reverse direction will continue to the full predetermined extent until the cam nut 90, by engaging the cam roller on the lever 85, temporarily forces trip rod 79 to the right, which results in the opening of the related pairs of contacts 76', 71' shutting off current over conductor 97, and causing the magnetic switch 98 again to shut off current to the motor B. Although the trip rod 79 is now held in its extreme right position with the contacts 76', 71' open, the trip rod 62 remains in its normal position with its corresponding contacts 76, 71 closed.

I claim:

1. In combination with a power transmission mechanism including a reversible motor, an electric control system comprising a member associated with said mechanism, said member normally held in a given position but movable longitudinally in one direction out of such position whenever the torque load on said mechanism, when the mechanism is operated in one direction, exceeds a predetermined amount, adjustable spring means holding said member in normal position but adapted to permit longitudinal movement of said member in one direction under said excessive torque load, a pivotally-mounted contact bracket, a pair of stationary contact points, an electrical conductor connected to each of said points, said bracket adapted when in closed position to connect said contact points, a snapover spring actuating said bracket, a slidable trip rod connected to said snapover spring, an engaging element carried by said member and adapted to engage said trip rod to cause said bracket to be swung to open position when said member is moved in one direction, said engaging element so arranged that said trip rod will not be engaged by said element and thus said bracket will not be swung to closed position by said member when said member returns to normal position, a manually-operated switch connecting one of said conductors to a source of electrical power, a magnetic switch connected with the other conductor, said magnetic switch connected to said motor, whereby the closing of said manually-operated switch will cause said motor to operate in one direction so long as said bracket is in closed position and the development of excessive torque load by causing said member to be moved will cause said bracket to be swung into open position and prevent further operation of said motor in that direction, even though said member returns to normal position, until said bracket is swung to closed position, a solenoid adapted, when energized, to move said trip rod in the opposite direction and thereby cause said bracket to be returned to closed position, a second circuit from said manually-operated switch to said magnetic switch controlling said motor and adapted, when closed, to cause said motor to operate in opposite direction, a second pivotally-mounted contact bracket in said second circuit, mechanically-operated means for automatically moving said second contact bracket to open position when said transmission mechanism has operated a predetermined amount in the opposite direction, spring means for keeping said second contact bracket in closed position normally, said second circuit connected also to said solenoid, whereby when said first mentioned contact bracket has been swung to open position by excessive torque load it can not be swung back to closed position until said second circuit is closed to cause said motor and transmission to operate in the opposite direction.

2. In combination with a power transmission mechanism including a reversible motor, an electric control system comprising a member associated with said mechanism, said member normally held in a given position but movable longitudinally out of such position whenever the torque load on said mechanism exceeds a predetermined amount, means holding said member in normal position but adapted to permit longitudinal movement of said member under said excessive torque load, a pivotally-mounted contact bracket, an electrical circuit adapted, when closed, to cause the operation of said motor in one direction, said contact bracket acting as a switch element in said circuit, a manually-operated switch in said circuit, whereby said circuit will be closed when said manually operated switch is closed and said bracket is in closed position, a slidable trip rod connected to said bracket, an engaging element carried by said member and adapted to engage said trip rod to cause said bracket to be swung to open position when said member is moved in one direction, said engaging element so arranged that said trip rod will not be engaged by said element and thus said bracket will not be swung to closed position when said member returns to normal position, a solenoid adapted, when energized, to move said trip rod in the opposite direction and thereby cause said bracket to be returned to closed position, a second circuit from said manually-operated switch controlling said motor and adapted, when closed, to cause said motor to operate in opposite direction, a limit switch in said second circuit, mechanically-operated means for automatically opening said limit switch when said transmission mechanism has operated a predetermined amount in the opposite direction, spring means for keeping said limit switch closed normally, said second circuit connected also to said solenoid, whereby when said contact bracket has been swung to open position by excessive torque load it can not be swung back to closed position until said second circuit is closed to cause said motor and transmission to operate in the opposite direction, a signal light adapted to be lighted by said bracket whenever this bracket is in closed position, and with said contact bracket including an insulating block with a pair of connected contact elements resiliently mounted on said insulating block.

3. In a power transmission mechanism including a reversible motor, a torque-control member associated with said mechanism and normally held in a given position by spring means but movable out of said position against the force of said spring means whenever the torque load on said mechanism resulting from the operation of the motor in one direction exceeds a predetermined amount, a contact bracket, an electrical circuit adapted, when closed, to cause the operation of said motor in one direction, said contact bracket acting as a switch element in said circuit, a manually-operated switch in said circuit, whereby said circuit will be closed when said manually-operated switch is closed and said bracket is in closed position, means associated with said torque-control member and said bracket to cause said bracket to be swung to open position when said member is moved against the force of said spring means, means tending to hold said bracket in either open or closed position and so arranged that said torque-control member will not cause said bracket to swing back to closed position when said member returns to normal position, a second electrical circuit adapted, when closed, to cause the operation of said motor in the opposite direction, a manually operated switch in said second circuit, a limit switch also acting as a switch element in said second circuit, spring means keeping said limit switch normally closed, mechanical means operating automatically to move said limit switch to open position temporarily when the running of said motor in said opposite direction has caused said transmission mechanism to be operated a predetermined amount, an automatic device for swinging said first-mentioned contact bracket to closed position whenever said motor operates in said opposite direction, whereby excessive torque load when said motor is operating in one direction will cause said first-mentioned contact bracket to be swung to open position interrupting the operation of said motor and said first-mentioned contact bracket cannot be swung back to closed position until said second circuit is closed for operating said motor in the opposite direction.

4. In a power transmission mechanism including a reversible motor, a torque-control member associated with said mechanism and normally held in a given position by spring means but movable out of said position against the force of said spring means whenever the torque load on said mechanism resulting from the operation of the motor in one direction exceeds a predetermined amount, a contact bracket, an electrical circuit adapted, when closed, to cause the operation of said motor in one direction, said contact bracket acting as a switch element in said circuit, a manually-operated switch in said circuit, whereby said circuit will be closed when said manually-operated switch is closed and said bracket is in closed position, a slidable trip rod connected to said bracket, an engaging element carried by said torque-control member and adapted to engage said trip rod to cause said bracket to be swung to open position when said member is moved against the force of said spring means, means tending to hold said bracket in either open or closed position and said torque-control member and said trip rod and engaging element so arranged that said trip rod will not be moved by the return of said member to normal position, a second electrical circuit adapted, when closed, to cause the operation of said motor in the opposite direction, a manually operated switch in said second circuit, a second contact bracket also acting as a switch element in said second circuit, spring means keeping said second contact bracket normally closed, mechanical means operating automatically to move said second contact bracket to open position temporarily when the running of said motor in said opposite direction has caused said transmission mechanism to be operated a predetermined amount, an automatic device for swinging said first-mentioned contact bracket to closed position whenever said motor operates in said opposite direction, whereby excessive torque load when said motor is operating in one direction will cause said first-mentioned contact bracket to be swung to open position interrupting the operation of said motor and said first-mentioned contact bracket cannot be swung back to closed position until said second circuit is closed for operating said motor in the opposite direction.

5. In a power transmission mechanism including a reversible motor, a torque-control member associated with said mechanism and normally held in a given position by spring means but movable out of said position against the force of said spring means whenever the torque load on said mechanism resulting from the operation of the motor in one direction exceeds a predetermined amount, a pivotally-mounted contact bracket, an electrical circuit adapted, when closed, to cause the operation of said motor in one direction, said contact bracket acting as a switch element in said circuit, a manually-operated switch in said circuit, whereby said circuit will be closed when said manually-operated switch is closed and said bracket is in closed position, a slidable trip rod connected to said snapover spring, an engaging element carried by said torque-control member and adapted to engage said trip rod to cause said bracket to be swung to open position when said member is moved in one direction against the force of said spring means, said snapover spring tending to hold said bracket in either open or closed position and said torque-control member and said trip rod and engaging element so arranged that said trip rod will not be moved by the return of said member to normal position, a second electrical circuit adapted, when closed, to cause the operation of said motor in the opposite direction, a manually-operated switch in said second circuit, a second pivotally mounted contact bracket also acting as a switch element in said second circuit, spring means keeping said second contact bracket normally closed, mechanical means operating automatically to move said second contact bracket to open position temporarily when the running of said motor in said opposite direction has caused said transmission mechanism to be operated a predetermined amount, a solenoid in said second circuit, said solenoid adapted, when energized, to cause said trip rod to be returned to starting position and thereby swing said first-mentioned contact bracket to closed position whenever said motor operates in said opposite direction, whereby excessive torque load when said motor is operating in one direction will cause said first-mentioned contact bracket to be swung to open position interrupting the operation of said motor and said first-mentioned contact bracket cannot be swung back to closed position until said second circuit is closed for operating said motor in the opposite direction.

6. In a power transmission mechanism including a reversible motor, a torque-control member associated with said mechanism and normally held in a given position by spring means but movable out of said position against the force of said spring means whenever the torque load on said mechanism resulting from the operation of the motor in one direction exceeds a predetermined amount, means preventing movement of said member when said motor is operating in the opposite direction, a contact bracket, an electrical circuit adapted, when closed, to cause the operation of said motor in said first-mentioned direction, said contact bracket acting as a switch element in said circuit, a manually-operated switch in said circuit, whereby said circuit will be closed when said manually-operated switch is closed and said bracket is in closed position, means associated with said torque-control member and said bracket to cause said bracket to be swung to open position when said member is moved against the force of said spring means in one direction, means tending to hold said bracket in either open or closed position and so arranged that said torque-control member will not cause said bracket to swing back to closed position when said member returns to normal position, a second electrical circuit adapted, when closed, to cause the operation of said motor in the opposite direction, a manually-operated switch in said second circuit, a limit switch also acting as a switch element in said second circuit, spring means keeping said limit switch normally closed, mechanical means operating automatically to move said limit switch to open position temporarily when the running of said motor in said opposite direction has caused said transmission mechanism to be operated a predetermined amount, a solenoid in said second circuit, said solenoid adapted, when energized, to cause said first-mentioned contact bracket to be swung to closed position, whereby excessive torque load when said motor is operating in said first-mentioned direction will cause said first-mentioned contact bracket to be swung to open position interrupting the operation of said motor and said first-mentioned contact bracket cannot be swung back to closed position until said second circuit is closed for operating said motor in the opposite direction, and whereby excessive torque load will not cause said sceond circuit to said motor to be interrupted when said motor is operating in the opposite direction.

7. In a power transmission mechanism including a reversible motor, a torque-control member associated with said mechanism and normally held in a given position by spring means but movable out of said position against the force of said spring means whenever the torque load on said mechanism resulting from the operation of the motor in one direction exceeds a predetermined amount, a pivotally-mounted contact bracket, an electrical circuit adapted, when closed, to cause the operation of said motor in one direction, said contact bracket acting as a switch element in said circuit, a manually-operated switch in said circuit, whereby said circuit will be closed when said manually-operated switch is closed and said bracket is in closed position, a slidable trip rod connected to said snapover spring, an engaging element carried by said torque-control member and adapted to engage said trip rod to cause said bracket to be swung to open position when said member is moved in one direction against the force of said spring means, said snapover spring tending to hold said bracket in either open or closed position and said torque-control member and said trip rod and engaging element so arranged that said trip rod will not be moved by the return of said member to normal position, a second electrical circuit adapted, when closed, to cause the operation of said motor in the opposite direction, a manually-operated switch in said second circuit, a second pivotally mounted contact bracket also acting as a switch element in said second circuit, spring means keeping said second contact bracket normally closed, mechanical means operating automatically to move said second contact bracket to open position temporarily when the running of said motor in said opposite direction has caused said transmission mechanism to be operated a predetermined amount, a solenoid in said second circuit, said solenoid adapted, when energized, to cause said trip rod to be returned to starting position and thereby swing said first-mentioned contact bracket to closed position, a signal light adapted to be lighted by said first-mentioned contact bracket whenever this bracket is in closed position, whereby excessive torque load when said motor is operating in one direction will cause said first-mentioned contact bracket to be swung to open position interrupting the operation of said motor and said first-mentioned contact bracket cannot be swung back to closed position until said second circuit is closed for operating said motor in the opposite direction.

SAMUEL WEISS.